United States Patent [19]

Kropp

[11] Patent Number: 4,738,102

[45] Date of Patent: Apr. 19, 1988

[54] HYDROSTATIC DRIVES

[75] Inventor: Walter Kropp, Sulzbach/Main, Fed. Rep. of Germany

[73] Assignee: Linde Aktiengesellschaft, Wiesbaden, Fed. Rep. of Germany

[21] Appl. No.: 914,334

[22] Filed: Oct. 2, 1986

[30] Foreign Application Priority Data

Oct. 7, 1985 [DE] Fed. Rep. of Germany ....... 3535771

[51] Int. Cl.[4] .................................... F16D 31/02

[52] U.S. Cl. .................................... 60/427; 60/452; 60/468; 60/484; 60/494

[58] Field of Search .................. 417/213, 218; 60/452, 60/445, 468, 494, 484, 427, 459

[56] References Cited

U.S. PATENT DOCUMENTS

| | | | |
|---|---|---|---|
| 3,175,800 | 3/1965 | Donner et al. | 60/427 X |
| 3,210,939 | 10/1965 | Nuss | 60/468 |
| 3,411,416 | 11/1968 | Herd et al. | 60/468 X |
| 3,444,689 | 5/1969 | Budzich | 60/427 |
| 4,010,610 | 3/1977 | Dunn | 60/468 X |
| 4,124,333 | 11/1978 | Liesener | 417/222 X |

*Primary Examiner*—Edward K. Look

*Attorney, Agent, or Firm*—Buell, Ziesenheim, Beck & Alstadt

[57] ABSTRACT

A hydrostatic drive with an adjustable pump and several consumers is provided in which one or several consumers simultaneously can be selectively connected with the pump, in which case the connection to a consumer can be effected by an arbitrarily actuable control valve having a throttling effect in the intermediate positions, where the loading of the adjusting element of the pump is controlled by a pump adjusting valve, which in turn is regulated by the pressure differential arising at the regulated control valve so that it is regulated to a constant pressure differential, where the highest prevailing pressure in a line between the regulated control valve and the regulated consumer is conveyed through a control pressure line to the control pressure chamber on the spring side of the pump adjusting valve and where a pressure limiting valve is connected to the pump delivery line and provided on the spring side with a control pressure chamber connected with the control pressure line (load-sensing signal line).

3 Claims, 2 Drawing Sheets

HYDROSTATIC DRIVES

Figure 1:
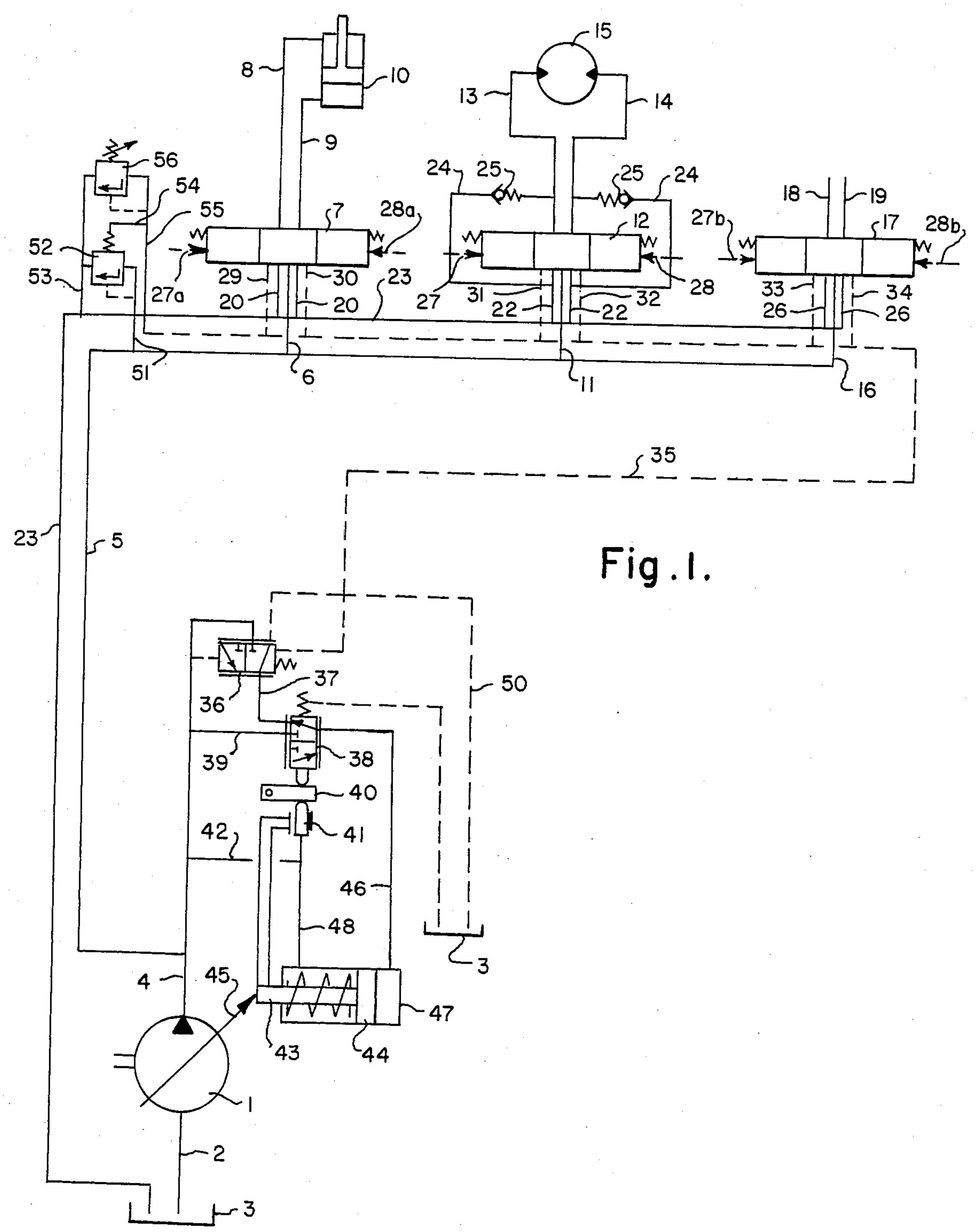

This invention relates to hydrostatic drives and particularly to a hydrostatic drive with an adjustable pump and a plurality of consumers any one or more of which simultaneously can be selectively connected with the pump.

In hydrostatic drives having an adjustable pump and several consumers of which one or several simultaneously can be selectively connected with the pump through an arbitrarily actuable control valve, it is possible that the valve effecting the connection to a consumer is closed more rapidly than the pump can swing back in the direction to the zero stroke position. As a result, a high pressure arises in the pump delivery line. The pressure limiting valve known to date for limiting this pressure had to be set at a pressure that corresponds to the maximum admissible pump delivery pressure. Because such a pressure limiting valve set to a high pressure responds with a certain time lag, high pressure peaks can arise if the pump is still delivering and the control valve is already essentially or completely closed and they load the pump and the pipeline system and they allow a greater stream to pass through if the control valves is set at a low rate of movement and thus they feed a larger stream to the consumer than is expected from the setting of the control valve, so that a higher rate of movement of the consumer than expected occurs. The control valve is generally a multi-way slide valve, especially part of a block control device.

In drive facilities with a constant pump it is already known to provide a load-sensing multiway valve with piston manometers that serve in such installations to maintain the pressure differential constant at the piston control edge for quantity regulation.

The invention proposes to improve the maximum pressure protection of a pump with load-sensing load adaptation and to avoid the development of high pressure peaks and thus to maintain the loads for the drive line as low as possible.

For this purpose, the pressure limiting valve that serves to protect the pump delivery line is loaded on the spring side with the pressure of the control pressure line (load-sensing signal line) and set at a pressure that is far below the maximum admissible pump delivery pressure, but is higher than the regulating pressure differential to which the pump adjusting valve is set. If it is provided, for example, that a pressure differential of 20 bar arises at the control valve and if the spring at the pump adjusting valve is accordingly set at 20 bar, the initial stressing force of the spring at the pressure limiting valve can be set at 50 bar, for example.

A response of the pressure limiting valve is thus also attained even with pressure peaks that are below the maximum admissible pressure, provided the pressure in the pump delivery line is sufficiently above the pressure in the control pressure line determined by the consumer that is loaded the most.

This invention solves these problems by providing a pressure limiting valve on the spring side of the pump with the control pressure chamber connected with the control pressure or load sensing signal line. Preferably the initial stressing force of the spring of the pressure limiting valve is set at a pressure that is above the pressure differential arising at the control valve, but substantially less than the maximum pressure in the pump delivery line.

Figure 2:
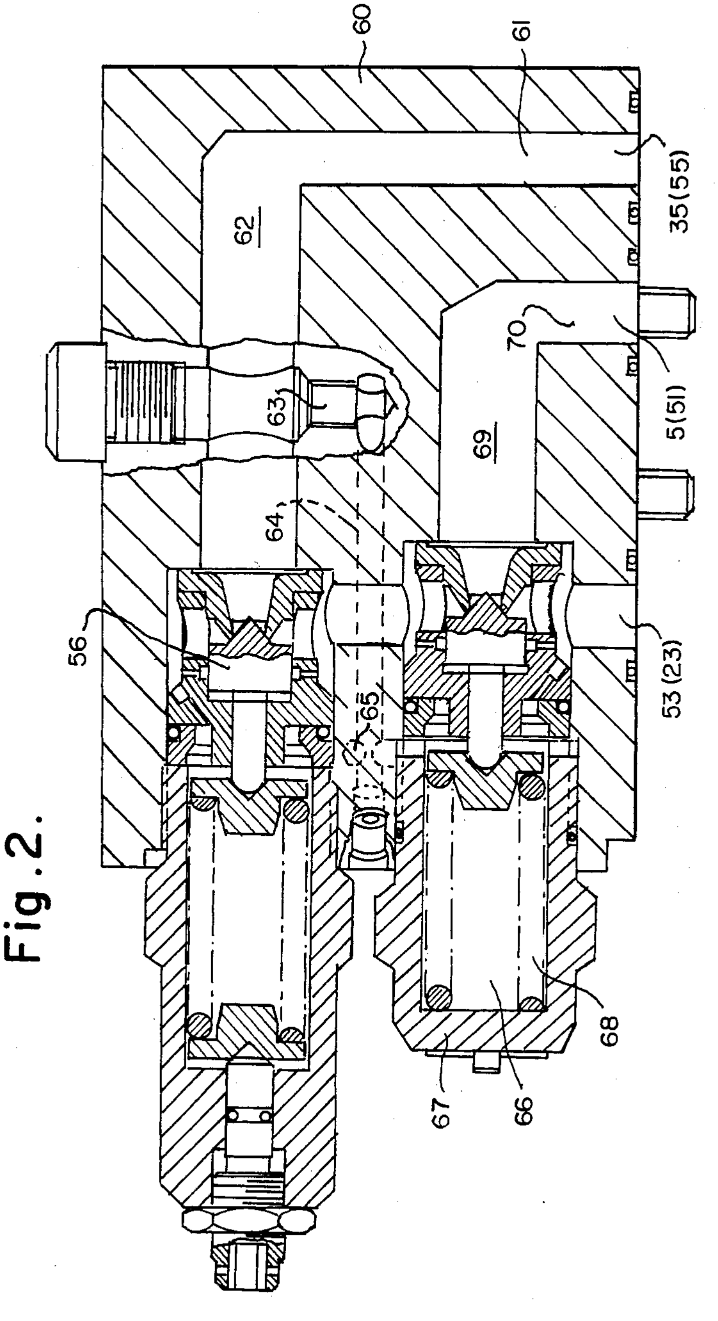

In the foregoing general description of this invention, I have set out certain objects, purposes and advantages of this invention. Other objects, purposes and advantages of this invention will be apparent from a consideration of the following description and the accompanying drawings in which:

FIG. 1 shows a circuit diagram for a hydrostatic drive with pressure limiting valve; and FIG. 2 shows an implementation example with two pressure limiting valves located in one housing.

Referring to the drawings, the adjustable pump 1 draws through the line 2 from the pressureless reservoir 3 and delivers into the pump delivery lines 4, 5.

A branch line 6 is connected to the pump delivery line 5. A multiway control valve 7, to which a consumer 10 is connected through the two lines 8 and 9, is connected to this branch line 6.

A multiway control valve 12 is also connected through the branch line 11 to the pump delivery line 5. A consumer 15 is connected through the two lines 13 and 14 to this multiway control valve 12.

A multiway control valve 17 is also connected through a branch line 16 to the pump delivery line 5. Another consumer (not shown in the drawing) is connected through the two lines 18 and 19 to this multiway control valve 17.

The return line of the two lines 8 and 9 is connected through the multiway valve 7 and one of the two lines 20 with the return line 23 leading to the pressure-less reservoir 3. The one of the two lines 13 and 14 acting as the return line is also connected through the multiway valve 12 and one of the two lines 22 with the return line 23, which leads to the reservoir 3. A resuction line 24 is connected to each of the two lines 22 through a return check valve 25, which permits a resuction in view of the great mass moment of inertia of the device driven by the hydraulic motor 15.

The return line of the two lines 18 and 19 is also connected through one of two lines 26 with the return line 23.

Two control pressure lines 27 and 28 are connected to each of the multiway control valves 7, 12 and 17. The control pressure lines 27 and 28 can be loaded with pressure by means of a control pressure transducer and serve to adjust the control valve 7 or 12 or 17.

Two load-sensing signal lines 29 and 30 are also connected to the multiway control valve 7 and two load-sensing signal lines 31 and 32 are connected in a similar manner to the control valve 12 and two load-sensing signal lines 33 and 34 are connected to the control valve 17. The load-sensing signal lines are connected and switched in the multiway valve 7 or 12 or 17 so that in one of these lines 29–34 the pressure prevails that is the highest of the pressures that are present in the lines 8, 9, 13, 14, 18 and 19. All these load-sensing signal lines 29–34 are connected to the load-sensing signal line 35, which leads to the control pressure chamber on the spring side of the pump adjusting valve 36, the second control pressure chamber and the entrance of which are connected to the pump delivery line 4.

The outlet of the pump adjusting valve 36 leads through the line 37 to an inlet of the power regulating valve 38, the second inlet of which is connected through the line 39 directly to the pump delivery line 4. The power regulating valve 38 is actuated through a lever 40, on which in turn the pressure measuring piston 31 acts, and on which the pump delivery pressure also acts through the line 42. The cylinder in which the pressure measuring piston 41 slides is connected mechanically with the servo piston rod 43, which in turn is connected with the servo piston 44 and the final control element 45 of the pump 1. The outlet of the power regulating valve 38 is connected through the line 46 with the large pressure chamber of the operating cylinder 47, while the pressure chamber of the operating cylinder 47 on the piston rod side is connected through the line 48 and the line 42 with the pump delivery line 4.

Another connection of the pump adjusting valve 36 is connected with the line 50 leading to the reservoir 3.

The pressure limiting valve 52 is connected to the pump delivery line 5 through a line 51. The outlet of this valve 52 is connected through the line 53 to the return line 23. The pressure chamber of the pressure limiting valve 52 on the spring side is connected to the load-sensing signal line 35 through the lines 54 and 55. An inlet of an additional pressure limiting valve 56 is also connected to the line 55.

The load-sensing regulation with the load-sensing signal acting through the load-sensing signal line 35 on the pump adjusting valve 36 operates in the usual manner.

The essential novelty according to the invention is that the pressure limiting valve 52 is provided on the spring side with a control pressure chamber, which is connected through the lines 54 and 55 to the load-sensing signal line 35. So long as the pressure differential between the pressure prevailing in the pump delivery line 5 and the pressure prevailing in the load-sensing signal line 35 persists in the order of magnitude that is provided as the pressure differential in the controlled multiway control valve 7 or 12 or 17 for the load-sensing regulation, the pressure limiting valve 52 remains closed regardless of how high the pressure is in the pump delivery line 5, because with increasing pressure in the pump delivery line 5 the pressure in the load-sensing signal line 35 also increases and this pressure, together with the spring, holds the pressure limiting valve 52 closed. However, if the multiway control valve 7 or 12 or 17 is closed and the pressure in the pump delivery line 5 increases because the adjustment of the pump 1 does not follow as rapidly, while the consumer pressure and thus the pressure in the load-sensing signal line 35 drops, the pressure differential between the lines 51 and 54 becomes greater than corresponds to the initial stressing force of the spring at the pressure limiting valve 52 and opens the pressure limiting valve 52 and allows pressure to pass from the pump delivery line 5 through the line 51 into the line 53 and from the latter into the return line 23.

A practical implementation of such a valve is shown in FIG. 2

A borehole 61 is provided in the housing 60. It is connected to the line 35 or 55 according to FIG. 1 and a branch borehole 62 leads from there to the inlet side of the pressure limiting valve 56. Connecting boreholes 63, 64 and 65 depart from the borehole 62; they lead to the inner chamber 66 inside of the spring housing 67 in which the spring 68 of the pressure limiting valve 52 is located. The inlet side of the valve 52 is connected through the boreholes 69 and 70 to the pump delivery line 5. The outlets of the two pressure limiting valves 52 and 56 are connected to the drain line 53, which is connected to the return line 23.

The spring of the pump adjusting valve 36 is set at 20 bar in the implementaiton example, while the spring 68 is set at 50 bar.

In the foregoing specification I have set out certain preferred practices and embodiments of this invention, however, it will be understood that this invention may be otherwise embodied within the scope of the following claims.

I claim:

1. A hydrostatic drive comprising an adjustable pump, a plurality of consumers of hydraulic fluid adapted to be connected to the outlet of said pump, means for simultaneously connecting one or more of said consumers selectively to said pump, adjusting means on said pump for adjusting the output thereof, a pump adjusting valve regulated by pressure differential at the means for connecting one or more consumers selectively to said pump, a control pressure line connecting the connections from the consumers to the means for connecting the consumers selectively to the pump whereby said pump adjusting valve is loaded with the highest prevailing pressure at the consumers and a spring loaded pressure limiting valve between the outlet of said pump and a pressureless reservoir, said pressure limiting valve having a control pressure line on the spring side connected with the control pressure line whereby fluid is bypassed from the pump outlet to the pressureless reservoir when the pressure in the control pressure line combine with the spring drops below the ouput pressure of the pump.

2. A hydrostatic drive as claimed in claim 1 wherein the means selectively connecting one or more consumers to the pump are arbitrarily actuable control valves between each consumer and the pump and each of which has a throttling effect in its intermediate position.

3. A hydrostatic drive as claimed in claim 2 wherein the initial stressing force of the spring in the pressure limiting valve is set at a pressure that is above the pressure differential arising at any one of the arbitrarily actuable control valves but substantially less than the maximum output pressure of the pump.

* * * * *